(12) United States Patent
Wei et al.

(10) Patent No.: US 11,075,679 B2
(45) Date of Patent: Jul. 27, 2021

(54) PORT INDEXING FOR CSI-RS WITH LARGER NUMBER OF ANTENNA PORTS FOR EFD-MIMO

(71) Applicant: QUALCOMM Incorporated, San Diego, CA (US)

(72) Inventors: Chao Wei, Beijing (CN); Wanshi Chen, San Diego, CA (US); Peter Gaal, San Diego, CA (US); Bo Chen, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 215 days.

(21) Appl. No.: 16/305,591

(22) PCT Filed: Jun. 22, 2017

(86) PCT No.: PCT/CN2017/089538
§ 371 (c)(1),
(2) Date: Nov. 29, 2018

(87) PCT Pub. No.: WO2018/010532
PCT Pub. Date: Jan. 18, 2018

(65) Prior Publication Data
US 2020/0328792 A1    Oct. 15, 2020

(51) Int. Cl.
*H04B 7/06* (2006.01)
*H04L 5/00* (2006.01)
*H04J 13/00* (2011.01)

(52) U.S. Cl.
CPC ......... *H04B 7/0626* (2013.01); *H04L 5/0053* (2013.01); *H04J 13/00* (2013.01)

(58) Field of Classification Search
CPC .................................................... H04B 7/0626
See application file for complete search history.

(56) References Cited

U.S. PATENT DOCUMENTS

| 2012/0243500 | A1  | 9/2012 | Chandrasekhar et al. |
| 2015/0215905 | A1  | 7/2015 | Park et al. |
| 2016/0094326 | A1* | 3/2016 | Moon .................... H04L 5/0091 370/330 |
| 2016/0134352 | A1* | 5/2016 | Stirling-Gallacher ...................... H04B 7/0639 370/329 |
| 2017/0202014 | A1* | 7/2017 | Moon ..................... H04L 5/005 |

(Continued)

FOREIGN PATENT DOCUMENTS

| CN | 102594516 A | 7/2012 |
| CN | 102687421 A | 9/2012 |
| CN | 102754357 A | 10/2012 |

(Continued)

OTHER PUBLICATIONS

Supplementary European Search Report—EP17826870—Search Authority—Munich—dated Dec. 20, 2019.

(Continued)

*Primary Examiner* — Andrew Lai
*Assistant Examiner* — Andrew C Lee
(74) *Attorney, Agent, or Firm* — Qualcomm Incorporated

(57) ABSTRACT

Mapping with CSI-RS resources with a code divisional multiplex (CDM) length of eight is disclosed. Such mapping allows for flexibly configuring the set of resource elements (REs) for mapping based on the available CSI-RS resources.

16 Claims, 15 Drawing Sheets

(56) References Cited

U.S. PATENT DOCUMENTS

2017/0264405 A1* 9/2017 Gao ..................... H04B 7/0417
2018/0091273 A1* 3/2018 Choi .................... H04L 5/0048

FOREIGN PATENT DOCUMENTS

| CN | 104158574 A | 11/2014 |
|---|---|---|
| CN | 104584625 A | 4/2015 |
| EP | 2469738 A2 | 6/2012 |
| WO | WO-2011096646 A2 | 8/2011 |
| WO | WO-2014046516 A1 | 3/2014 |
| WO | WO-2014051374 A1 | 4/2014 |

OTHER PUBLICATIONS

International Search Report and Written Opinion—PCT/CN2016/090126—ISA/EPO—dated Mar. 20, 2017.
"International Search Report and Written Opinion—PCT/CN2017/089538—ISA/EPO—dated Sep. 21, 2017".

* cited by examiner

Port assignment for CDM-2

Port assignment for CDM-4

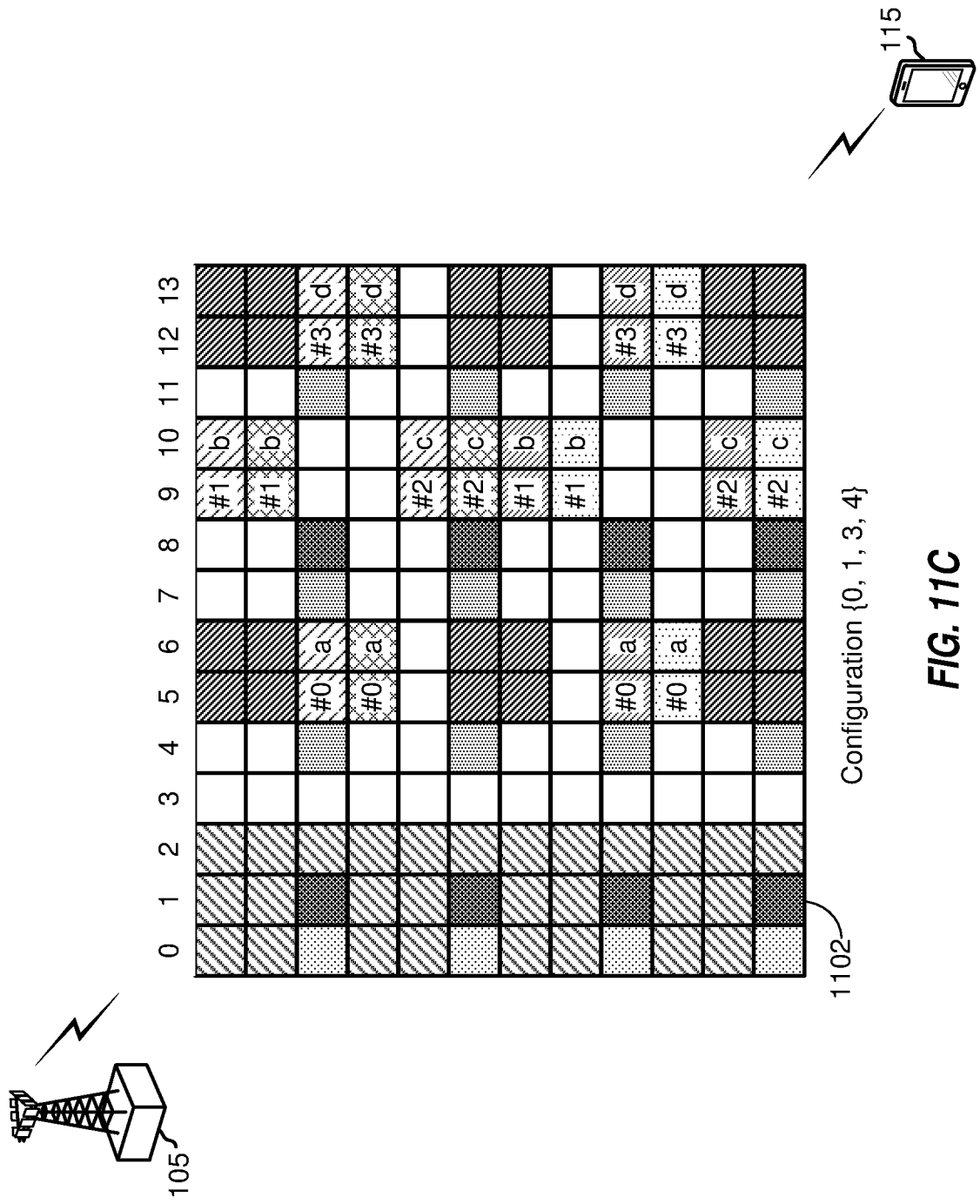

PORT INDEXING FOR CSI-RS WITH LARGER NUMBER OF ANTENNA PORTS FOR EFD-MIMO

CROSS-REFERENCE TO RELATED APPLICATIONS

This application claims the benefit of Application No. PCT/CN2016/090126, entitled, "PORT INDEXING FOR CSI-RS WITH LARGER NUMBER OF ANTENNA PORTS FOR EFD-MIMO," filed on Jul. 15, 2016, which is expressly incorporated by reference herein in its entirety.

BACKGROUND

Field

Aspects of the present disclosure relate generally to wireless communication systems, and more particularly, to port indexing for channel state information (CSI) reference signal (CSI-RS) with larger number of antenna ports for enhanced full dimension multiple input, multiple output (eFD-MIMO) systems.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes determining a channel state information (CSI) reference signal (CSI-RS) configuration by a base station with a CSI-RS resource having greater than or equal to 16-ports, identifying a group of CSI-RS configurations into which one or more CSI-RS ports of the CSI-RS resource will be mapped, applying a permutation to each port on the same polarization according to the configuration, and sequentially mapping the permuted CSI-RS ports to each component configuration.

In an additional aspect of the disclosure, a method of wireless communication includes determining, by a base station, a CSI-RS resource having greater than a threshold number of antenna ports and a code divisional multiplex (CDM) length of at least eight, identifying a group of four CSI-RS configurations into which one or more CSI-RS ports of the CSI-RS resource will be mapped into, mapping each of the one or more ports of the CSI-RS resource into each configuration of the group of four CSI-RS configurations, allocating the one or more mapped ports to a set of resource elements (REs) within the corresponding configuration of the group of four CSI-RS configurations, and selecting one CSI-RS configuration of the group of four CSI-RS configurations for CSI-RS transmission based on available CSI-RS resources and subframe type.

In an additional aspect of the disclosure, an apparatus configured for wireless communication includes means for determining a CSI-RS configuration by a base station with a CSI-RS resource having greater than or equal to 16-ports, means for identifying a group of CSI-RS configurations into which one or more CSI-RS ports of the CSI-RS resource will be mapped, means for applying a permutation to each port on the same polarization according to the configuration, and means for sequentially mapping the permuted CSI-RS ports to each component configuration.

In an additional aspect of the disclosure, an apparatus configured for wireless communication includes means for determining, by a base station, a CSI-RS resource having greater than a threshold number of antenna ports and a CDM length of at least eight, means for identifying a group of four CSI-RS configurations into which one or more CSI-RS ports of the CSI-RS resource will be mapped, means for mapping each of the one or more ports of the CSI-RS resource into each configuration of the group of four CSI-RS configurations, means for allocating the one or more mapped ports to a set of REs within the corresponding configuration of the group of four CSI-RS configurations, and means for selecting one CSI-RS configuration of the group of four CSI-RS configurations for CSI-RS transmission based on available CSI-RS resources and subframe type.

In an additional aspect of the disclosure, a non-transitory computer-readable medium having program code recorded thereon. When executed by a computer, the program code causes the computer to control or implement the functionality based on the instructions of the program code. The program code further includes code to determine a CSI-RS configuration by a base station with a CSI-RS resource having greater than or equal to 16-ports, code to identify a group of CSI-RS configurations into which one or more CSI-RS ports of the CSI-RS resource will be mapped, code to apply a permutation to each port on the same polarization according to the configuration, and code to sequentially map the permutated CSI-RS ports to each component configuration.

In an additional aspect of the disclosure, a non-transitory computer-readable medium having program code recorded thereon. When executed by a computer, the program code causes the computer to control or implement the functionality based on the instructions of the program code. The program code further includes code to determine, by a base station, a CSI-RS resource having greater than a threshold number of antenna ports and a CDM length of at least eight, code to identify a group of four CSI-RS configurations into which one or more CSI-RS ports of the CSI-RS resource will be mapped, code to map each of the one or more ports of the CSI-RS resource into each configuration of the group of four CSI-RS configurations, code to allocate the one or more mapped ports to a set of REs within the corresponding configuration of the group of four CSI-RS configurations, and code to select one CSI-RS configuration of the group of four CSI-RS configurations for CSI-RS transmission based on available CSI-RS resources and subframe type.

In an additional aspect of the disclosure, an apparatus configured for wireless communication is disclosed. The apparatus includes at least one processor, and a memory coupled to the processor. The processor is configured to determine a CSI-RS configuration by a base station with a CSI-RS resource having greater than or equal to 16-ports, to identify a group of CSI-RS configurations into which one or more CSI-RS ports of the CSI-RS resource will be mapped, to apply a permutation to each port on the same polarization according to the configuration, and to sequentially map the permutated CSI-RS ports to each component configuration.

In an additional aspect of the disclosure, an apparatus configured for wireless communication is disclosed. The apparatus includes at least one processor, and a memory coupled to the processor. The processor is configured to determine, by a base station, a CSI-RS resource having greater than a threshold number of antenna ports and a CDM length of at least eight, to identify a group of four CSI-RS configurations into which one or more CSI-RS ports of the CSI-RS resource will be mapped, to map each of the one or more ports of the CSI-RS resource into each configuration of the group of four CSI-RS configurations, to allocate the one or more mapped ports to a set of REs within the corresponding configuration of the group of four CSI-RS configurations, and to select one CSI-RS configuration of the group of four CSI-RS configurations for CSI-RS transmission based on available CSI-RS resources and subframe type.

In an additional aspect of the disclosure, a method of wireless communication includes determining, by a base station, a CSI-RS resource having greater than or equal to a threshold number of antenna ports and a CDM length of at least eight, identifying a group of four CSI-RS configurations into which one or more CSI-RS ports of the CSI-RS resource will be mapped into, mapping each of the one or more ports of the CSI-RS resource into each configuration of the group of four CSI-RS configurations, allocating the one or more mapped ports to a set of REs within the corresponding configuration of the group of four CSI-RS configurations, and transmitting the one or more CSI-RS ports from the determined set of resource elements within the group of four CSI-RS configurations.

In an additional aspect of the disclosure, an apparatus configured for wireless communication includes means for determining, by a base station, a CSI-RS resource having greater than or equal to a threshold number of antenna ports and a CDM length of at least eight, means for identifying a group of four CSI-RS configurations into which one or more CSI-RS ports of the CSI-RS resource will be mapped into, means for mapping each of the one or more ports of the CSI-RS resource into each configuration of the group of four CSI-RS configurations, means for allocating the one or more mapped ports to a set of REs within the corresponding configuration of the group of four CSI-RS configurations, and means for transmitting the one or more CSI-RS ports from the determined set of resource elements within the group of four CSI-RS configurations.

In an additional aspect of the disclosure, a non-transitory computer-readable medium having program code recorded thereon. When executed by a computer, the program code causes the computer to determine, by a base station, a CSI-RS resource having greater than or equal to a threshold number of antenna ports and a CDM length of at least eight, to identify a group of four CSI-RS configurations into which one or more CSI-RS ports of the CSI-RS resource will be mapped into, to map each of the one or more ports of the CSI-RS resource into each configuration of the group of four CSI-RS configurations, to allocate the one or more mapped ports to a set of REs within the corresponding configuration of the group of four CSI-RS configurations, and to transmit the one or more CSI-RS ports from the determined set of resource elements within the group of four CSI-RS configurations.

In an additional aspect of the disclosure, an apparatus configured for wireless communication is disclosed. The apparatus includes at least one processor, and a memory coupled to the processor. The processor is configured to determine, by a base station, a CSI-RS resource having greater than or equal to a threshold number of antenna ports and a CDM length of at least eight, to identify a group of four CSI-RS configurations into which one or more CSI-RS ports of the CSI-RS resource will be mapped into, to map each of the one or more ports of the CSI-RS resource into each configuration of the group of four CSI-RS configurations, to allocate the one or more mapped ports to a set of REs within the corresponding configuration of the group of four CSI-RS configurations, and to transmit the one or more CSI-RS ports from the determined set of resource elements within the group of four CSI-RS configurations.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label.

Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 11A-11C are block diagrams illustrating an eNB, configured according to aspects of the present disclosure with a CSI-RS resource mapping of CDM length eight for CSI-RS transmissions to a UE.

DETAILED DESCRIPTION

Figure 1:
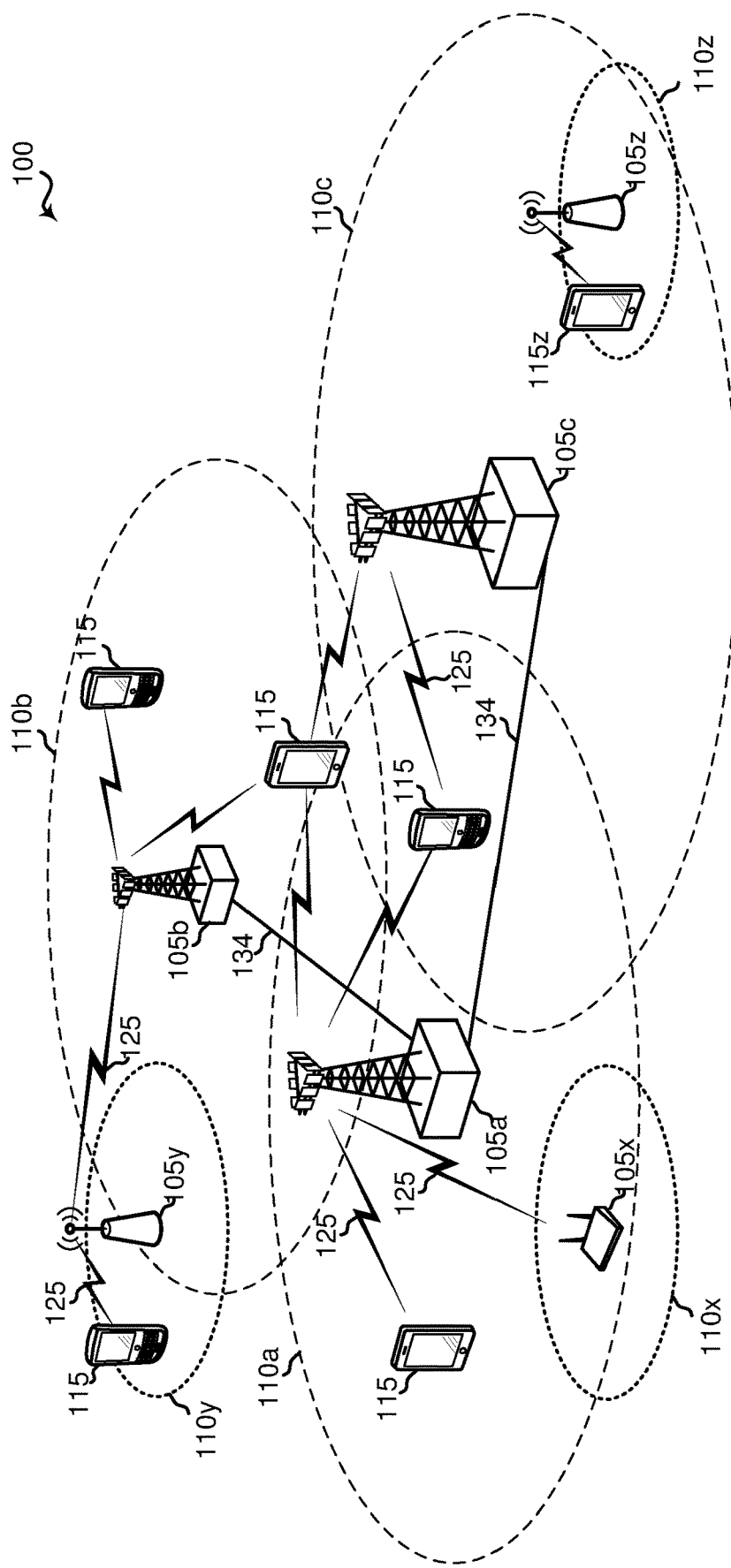
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd. Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including in unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11 a/g, 802.16, High Performance Radio LAN-2 (HIPERLAN-2, wherein LAN stands for Local Area Network) standardized by the European Telecommunications Standards Institute (ETSI). Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. The wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG). UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Wired backhaul communication 134 indicate wired backhaul communications that may occur between eNB s.

LTE/-A utilizes orthogonal frequency division multiplexing (OPDM) on the downlink and single-carrier frequency division multiplexing (SC-FDM) on the uplink. OFDM and SC-FDM partition the system bandwidth into multiple (X) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (X) may be dependent on the system bandwidth. For example, X may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
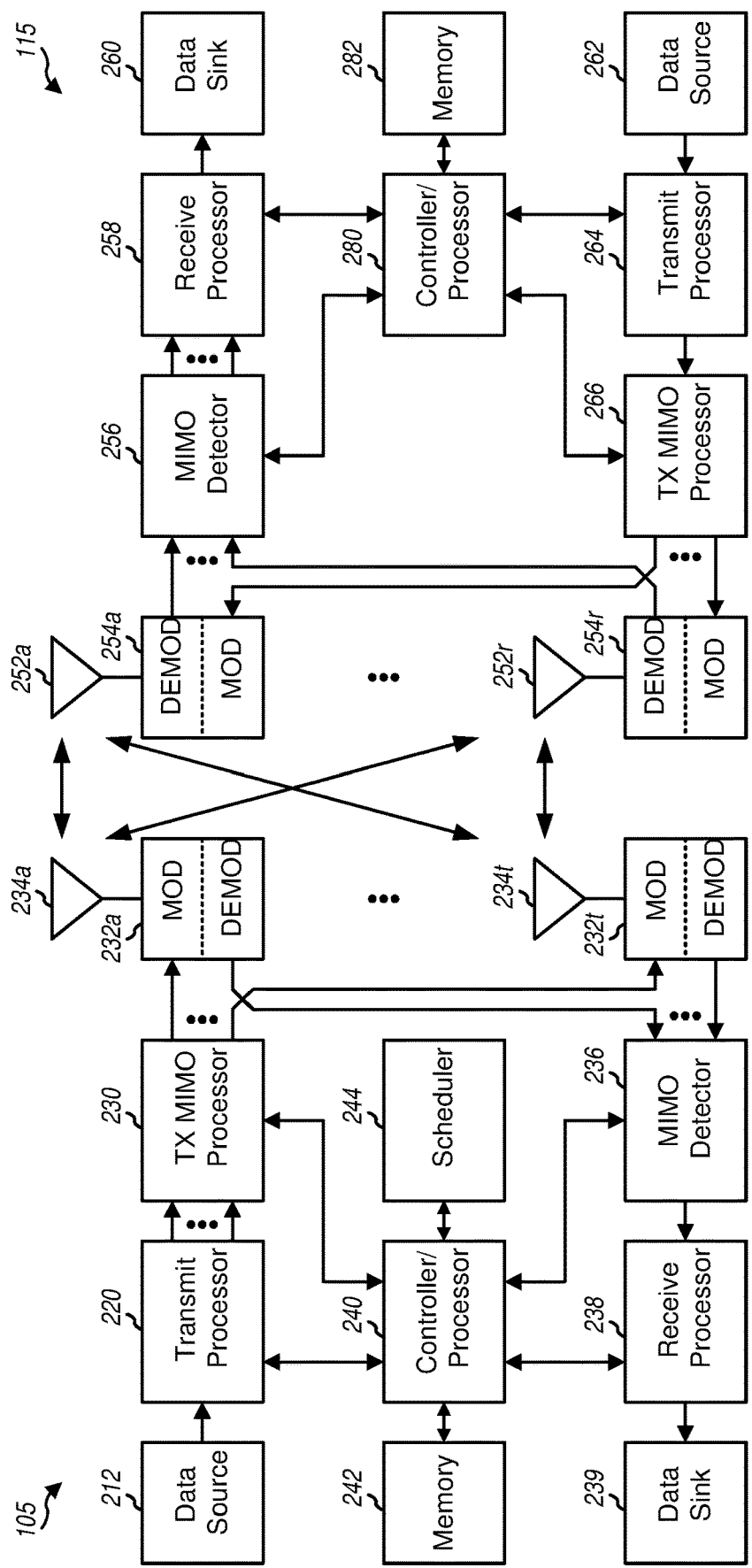
FIG. 2 is a block diagram conceptually illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODS) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-MK etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIGS. 8 and 10, and/or other processes for the techniques described herein. The memories 242 and 282 may store data and program codes for the eNB 105 and the UE 115, respectively. A scheduler 244 may schedule UEs for data transmission on the downlink and/or uplink.

Multiple-input multiple-output (MIMO) technology generally allows communication to take advantage of the spatial dimension through use of channel state information (CSI) feedback at the eNB. An eNB may broadcast cell-specific CSI reference signals (CSI-RS) for which the UE measures CSI based on configurations signaled by eNB via RRC, such as CSI-RS resource configuration and transmission mode. The CSI-RS are periodically transmitted at periodicities of 5, 10, 20, 40, 80 ms, or the like. A UE may report CSI at CSI reporting instances also configured by the eNB. As a part of CSI reporting the UE generates and reports channel quality indicator (CQI), precoding matrix indicator (PMI), and rank indicator (RI). The CSI can be reported either via PUCCH or via PUSCH and may be reported either periodically or aperiodically, with potentially different granularity. When reported via PUCCH, the payload size for CSI may be limited.

In order to increase system capacity, full-dimensional (FD)-MIMO technology has been considered, in which an eNB uses a two-dimensional (2D) active antenna array with a large number of antennas with antenna ports having both horizontal and vertical axes, and has a larger number of transceiver units. For conventional MIMO systems, beamforming has typically implemented using only azimuth dimension, although of a 3D multi-path propagation. However, for FD-MIMO each transceiver unit has its own independent amplitude and phase control. Such capability together with the 2D active antenna array allows the transmitted signal to be steered not only in the horizontal direction, as in conventional multi-antenna systems, but also simultaneously in both the horizontal and the vertical direction, which provides more flexibility in shaping beam directions from an eNB to a UE. Providing dynamic beam steering in the vertical direction has been shown to result in significant gain in interference avoidance. Thus, FD-MIMO technologies may take advantage of both azimuth and elevation beamforming, which would greatly improve MIMO system capacity and signal quality.

Figure 3:
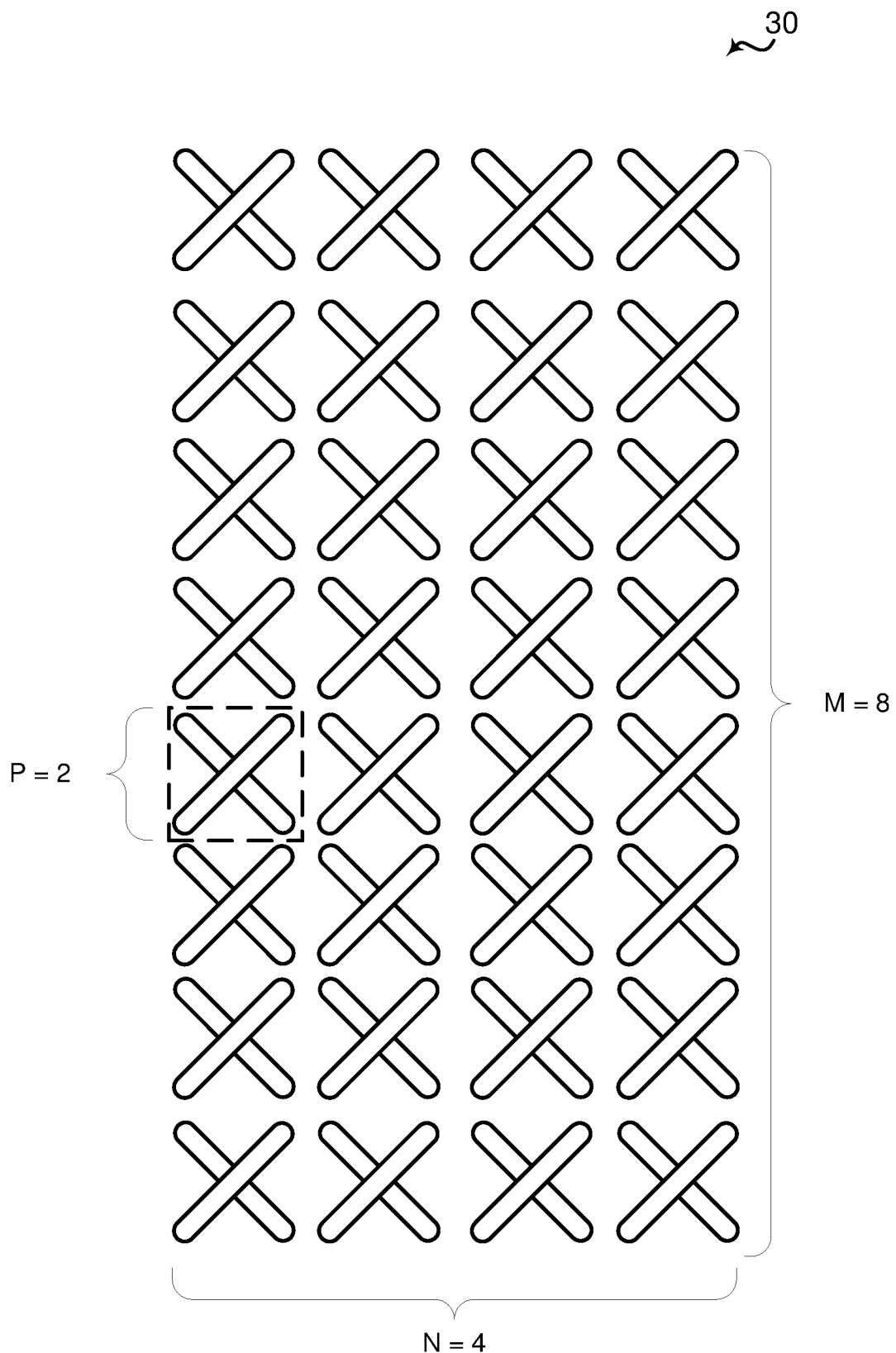
FIG. 3 is a block diagram illustrating a typical 2D active antenna array.

FIG. 3 is a block diagram illustrating a typical 2D active antenna array 30. Active antenna array 30 is a 64-transmitter, cross-polarized uniform planar antenna array comprising four columns, in which each column includes eight cross-polarized vertical antenna elements. Active antenna arrays are often described according to the number of antenna columns (N), the polarization type (P), and the number of vertical elements having the same polarization type in one column (M). Thus, active antenna array 30 has four columns (N=4), with eight vertical (M=8) cross-polarized antenna elements (P=2).

For a 2D array structure, in order to exploit the vertical dimension by elevation beamforming the CSI is needed at the base station. The CSI, in terms of PMI, RI, and CQI, can be fed back to the base station by a mobile station based on downlink channel estimation and predefined PMI codebook (s). However, different from the conventional MIMO system, the eNB capable of FD-MIMO is typically equipped with a large scale antenna system and, thus, the acquisition of full array CSI from the UE is quite challenging due to the complexity of channel estimation and both excessive downlink CSI-RS overhead and uplink CSI feedback overhead.

Figure 4A:
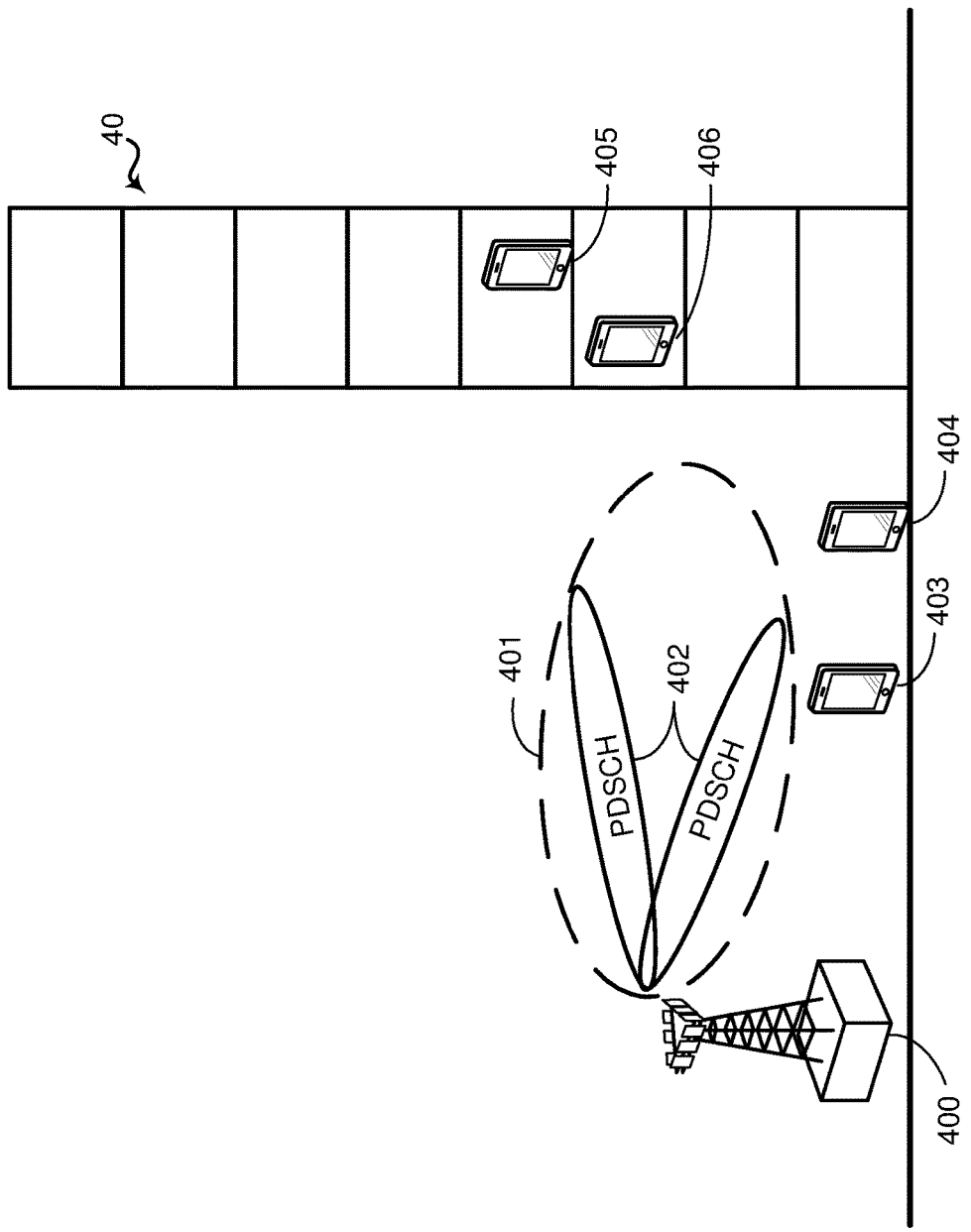
FIG. 4A is a block diagram illustrating an example base station transmitting non-precoded CSI-RS.

For CSI reporting in systems having FD-MIMO, a CSI process may be configured with either of two CSI reporting classes, class A non-precoded or class B beamformed. FIG. 4A is a block diagram illustrating an example base station 400 transmitting non-precoded CSI-RS 401. In class A non-precoded CSI reporting, one non-zero power (NZP) CSI-RS resource per CSI process may be used for channel measurement in which the number of CSI-RS ports may be 8, 12, or 16. This category includes schemes where different CSI-RS ports may have the same wide beam width and direction and, hence, generally are useful in cell wide coverage. Interference measurement in class A reporting may include one CSI-interference measurement (IM) resource per CSI process. The UE may report rank indicator, and CQI, as well as PMI, which consists of a first PMI corresponding to the parameters ($i_{11}$, $i_{12}$) and one or multiple second PMI corresponding to the parameter, $i_2$.

Base station 400 serves UEs 403 and 404 and UEs 405 and 406 in structure 40. 2D CSI-RS ports transmit non-precoded CSI-RS 401 and PDSCH 402 to UEs 403-406. In reporting CSI feedback, UEs 403-406 measure the non-precoded CSI-RS and reports CQI, first PMI ($i_{11}$, $i_{12}$) and one or more second PMI, $i_2$, (2D codebook), and rank indicator to base station 400.

Figure 4B:
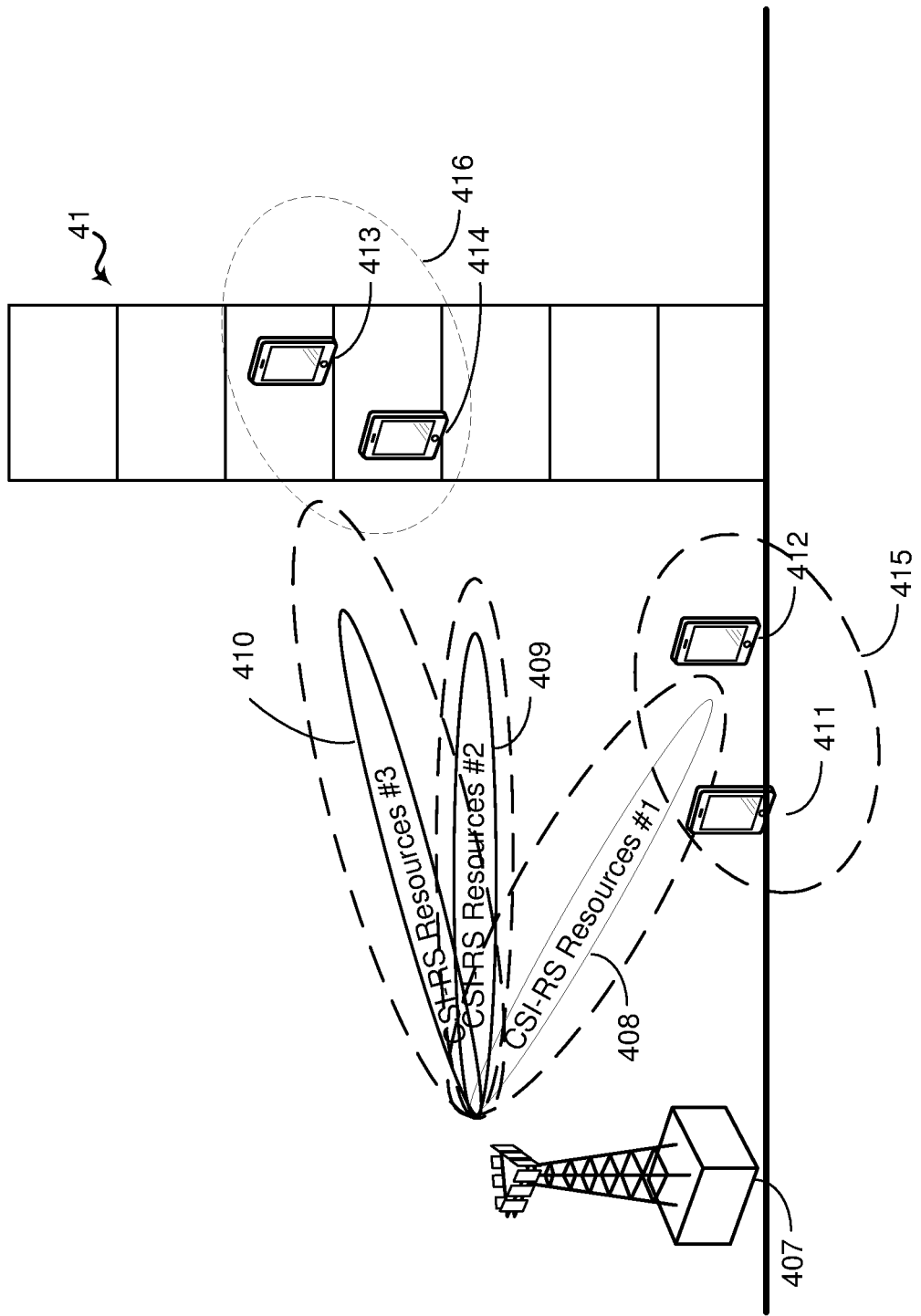
FIG. 4B is a block diagram illustrating an example base station transmitting beamformed CSI-RS using CSI-RS resources.

FIG. 4B is a block diagram illustrating an example base station 407 transmitting beamformed CSI-RS using CSI-RS resources 408-410. CSI-RS resources 408-410 may be directed to serve different UE groups, such as UE group 415, including UEs 411 and 412, and UE group 416, including UEs 413 and 414 in structure 41. Because different CSI-RS resources are used for different UE groups, when providing CSI feedback, UEs 411-414 report CQI, PMI (1D codebook), rank indicator, as well as the CSI-RS resource indicator (CRI), if K>1, which identifies to base station 407 which of the CSI-RS resources the UE has measured and provided channel state information (CSI) feedback for.

In class B beamformed CSI reporting, each CSI process may be associated with K NZP CSI-RS resources/configurations, with $N_k$ ports for the $k^{th}$ CSI-RS resource (K could be ≥1), in which $N_k$ may be 1, 2, 4, or 8, and may be different for each CSI-RS resource. Each CSI-RS resource may also have different CSI-RS port virtualization, e.g., virtualized from different sets of antenna elements or from the same set of antenna elements but with different beamforming weights. Multiple CSI-IM per CSI process is also possible, with one-to-one linkage to each NZP CSI-RS resource.

For FD-MIMO, CSI-RS with more than 8 ports may be supported. CSI-RS port layout can be either 1-D or 2-D, according to the configured parameters ($N_1$, $N_2$), for which $N_1$ and $N_2$ determines the number of CSI-RS port in the $1^{st}$ and $2^{nd}$ dimension.

Figure 5:
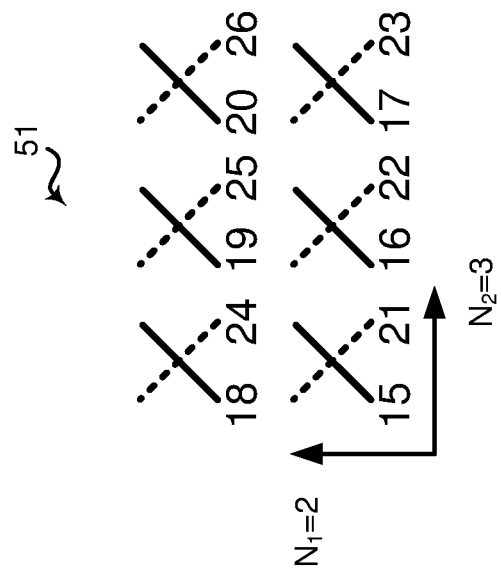
FIG. 5 is a block diagram illustrating different port configurations for a 12-port CSI-RS resource.
Figure 5:
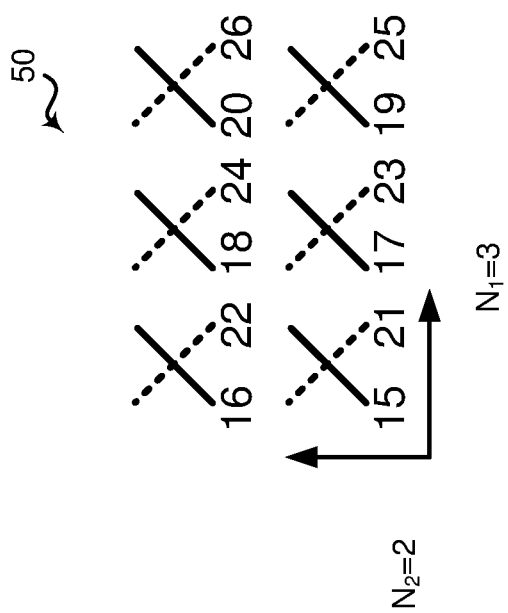

FIG. 5 is a block diagram illustrating different port layout configurations 50 and 51 for a 12-port CSI-RS resource. Each of the antenna arrays illustrated in port configurations 50 and 51 is a 12-port antenna array. However, whichever number is designated for $N_1$ and $N_2$ will result in a different configuration of antenna ports. For example, with port configuration 50, $N_1=3$ and $N_2=2$. Therefore, port configuration 50 begins with port 15 with port 16 being designated as the first port in the row of ports above. In contrast, because port configuration 51 uses $N_1=2$ and $N_2=3$, after port 15, port 16 is in the next column of antenna ports.

For CSI-RS design with more than 8 ports, two things are generally considered: port indexing and resource configuration. Resource configuration assigns a set of physical resource elements (REs) for CSI-RS and port indexing includes mapping of CSI-RS ports to the assigned REs. Rel-13, a 12-port or 16-port CSI-RS resource is composed as an aggregation of K CSI-RS configurations (e.g., K predetermined RE patterns). For example, a 12-port resource may be aggregated by three 4-port CSI-RS configurations and a 16-port resource may be aggregated by two 8-port configurations. Table 1 below indicates the resource configurations for 12- and 16-port antennas.

TABLE 1

| Total number of antennas ports | Number of antenna ports per resource | Number of CSI-RS resources |
| --- | --- | --- |
| 12 | 4 | 3 |
| 16 | 8 | 2 |

For port indexing, e.g., assigning a CSI-RS port to a predetermined RE pattern, the mapping approach may depend upon the configurable code division multiplex (CDM) length (e.g., 2 or 4), which means that the mapping may be different depending on the CDM length. For a CDM length of two, the port indexing may be determined by:

$$p = \begin{cases} p' + \dfrac{N_{ports}^{CSI}}{2} i & \text{for } p' \in \{15, \ldots, 15 + N_{ports}^{CSI}/2 - 1\} \\ p' + \dfrac{N_{ports}^{CSI}}{2}(i + N_{ports}^{CSI} - 1) & \text{for } p' \in \{15 + N_{ports}^{CSI}/2, \ldots, 15 + N_{ports}^{CSI} - 1\} \end{cases} \quad (1)$$

and, for a CDM length of four, the port index may be determined by:

$$p = iN_{ports}^{CSI} + p' \text{ for } p' \in \{15, 16, \ldots, 15 + N_{ports}^{CSI} - 1\} \quad (2)$$

Where, p represents the port index in the 12- and 16-port CSI-RS resource, p' represents port numbering within each component configuration, $N_{ports}^{CSI}$ represents a number of ports in the component configurations, and i represents the index of the component configuration. It can be seen that, for a CDM length of two, the cross-polarized antenna ports are assigned to each component CSI-RS configuration, and, for a CDM length of four, sequential mapping of CSI-RS ports to each component configuration is applied and, as a result, antenna ports mapped to each component configuration may not be on same polarization.

Figure 6A:
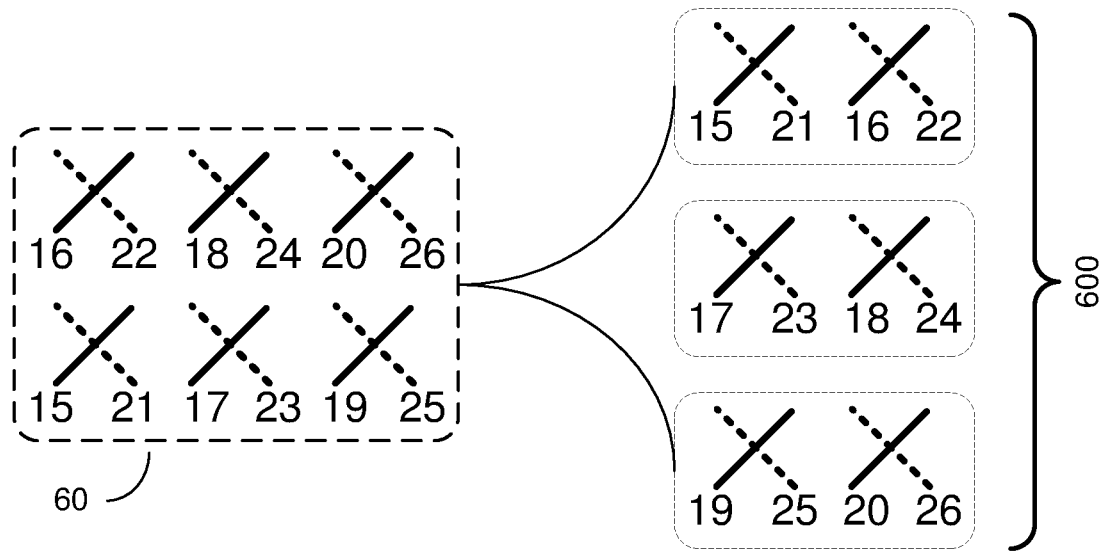
FIGS. 6A and 6B are block diagrams illustrating example aggregation of multiple 4-port CSI-RS resources into a 12-port CSI-RS resource.
Figure 6B:
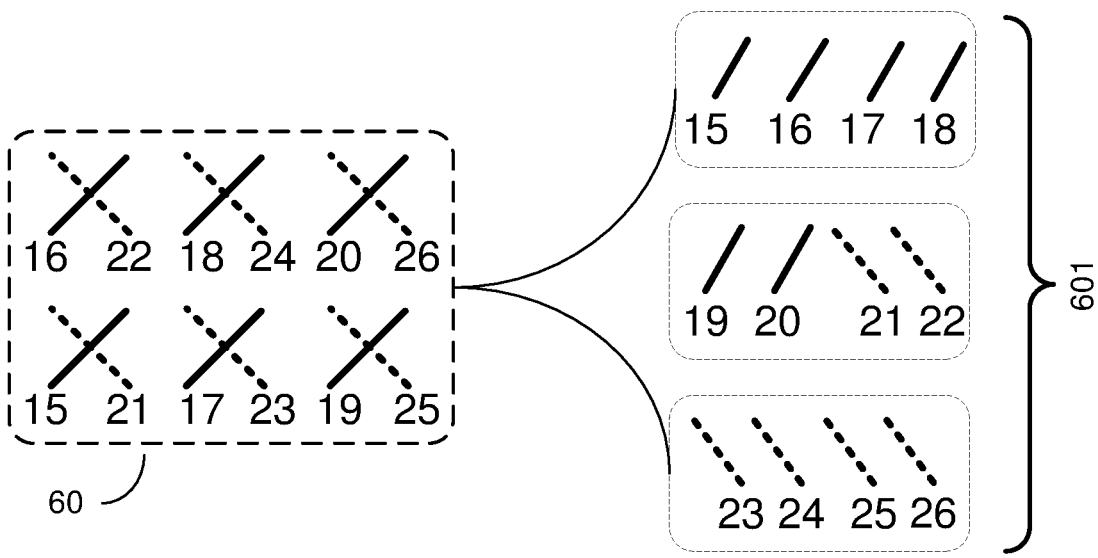

FIGS. 6A and 6B are block diagrams illustrating example aggregation of multiple 4-port CSI-RS resources into a 12-port CSI-RS resource G0. CSI-RS resource 60 is a 12-port (3,2,2) antenna array. When configured with a CDM length of 2, as illustrated in FIG. 6A, CSI-RS resource 60 is implemented through aggregation of three 4-port CSI-RS resources 600, in which the antenna ports of the 4-port CSI-RS resources 600 are selected based on cross-polarized antenna port sets. When configured with a CDM length of 4, as illustrated in FIG. 6B, CSI-RS resource 60 is also implemented through aggregation of three 4-port CSI-RS resources 601, in which the antenna ports of the 4-port CSI-RS resources 601 are sequential by antenna port indexing of the ports of CSI-RS resource 60 regardless of polarization.

It should be noted that CDM length 4 is typically applied to Rel-13 12/16-port CSI-RS resources, but usually not for Rel-12 4/8-port CSI-RS resources.

For CSI-RS with more than 16-ports (e.g., 20, 24, 28, 32 ports), the aggregation approach for resource configuration may be reused. In one optional aspect, the same $N_k$ may be used for all K component CSI-RS configurations. In another optional aspect, a different $N_k$ may be used for different component CSI-RS configurations.

For CSI-RS with more than 16-ports, one design target is to allow port sharing with CSI-RS resources having smaller numbers of antenna ports, such as 8 and 16 ports. For example, ports mapped to one CSI-RS configuration may be reused by a legacy CSI-RS resource (e.g., 8 or 16-ports). For the case of CDM length two, the port indexing for CSI-RS with more than 16-ports can reuse the Rel-13 methodology for 12/16-ports CSI-RS in order to keep cross-polarized antenna ports on each component CSI-RS configuration. Port sharing of CDM length two CSI-RS resources with legacy CSI-RS resources is, thus, supported. For the case of CDM length four, however, reusing the Rel-13 port indexing methodology (e.g., sequential mapping) does not support port sharing with legacy CSI-RS resources for CSI-RS port layout configurations when $N_2$ is neither 2 or 4. In networks where CDM length eight is supported, port indexing for CSI-RS resources with more than 16-ports should support CDM lengths across multiple CSI-RS configurations.

Figure 7:
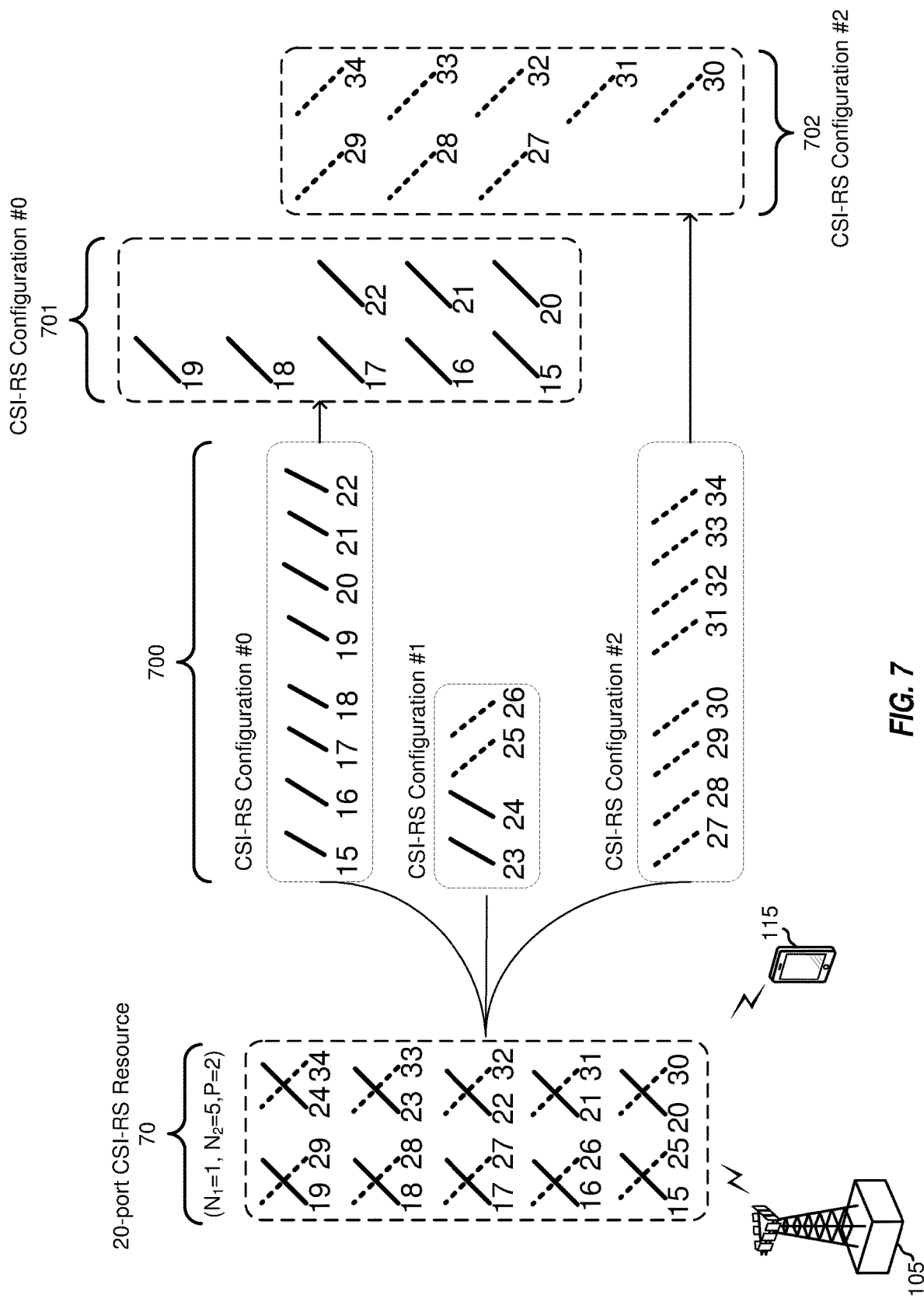
FIG. 7 is a block diagram illustrating an example mapping of a 20-port CSI-RS resource with a CDM length of four.

FIG. 7 is a block diagram illustrating a eNB 105 performing an example mapping of a 20-port CSI-RS resource 70, with a CDM length of four for CSI-RS transmissions to UE 115. As noted above, port sharing with a 16-port CSI-RS resource may not be feasible when reusing existing CDM length four port indexing for a 20-port CSI-RS resource with $N_1=2$ and $N_2=5$. A 16-port CSI-RS resource with CDM length four provides for the antenna ports on each valid component configuration to be either a uniform 1D port layout or a uniform 2D port layout. If a component configuration results in a non-uniform 1D or 2D layout of ports, the resulting configuration would be invalid for the 16-port CSI-RS resource. 20-port CSI-RS resource 70 is shown mapped by eNB 105 to CSI-RS mappings 700 including, an 8-port CSI-RS resource of CSI-RS configuration #0, a 4-port CSI-RS resource of CSI-RS configuration #1, and a second 8-port CSI-RS resource of CSI-RS configuration #2. However, as illustrated with CSI-RS mappings 700, CSI-RS ports mapped from 20-port CSI-RS resource 70 to CSI-RS configuration #0 701 and CSI-RS configuration #2 702 do not have either a uniform 1D or uniform 2D structure. Thus, CSI-RS configuration #0 and #2 may not be configured for a 16-port CSI-RS resource for allowing port sharing. Accordingly, various aspects of the present disclosure provide for port permutation for certain CSI-RS configurations in order to create uniform resource configurations.

Figure 8:
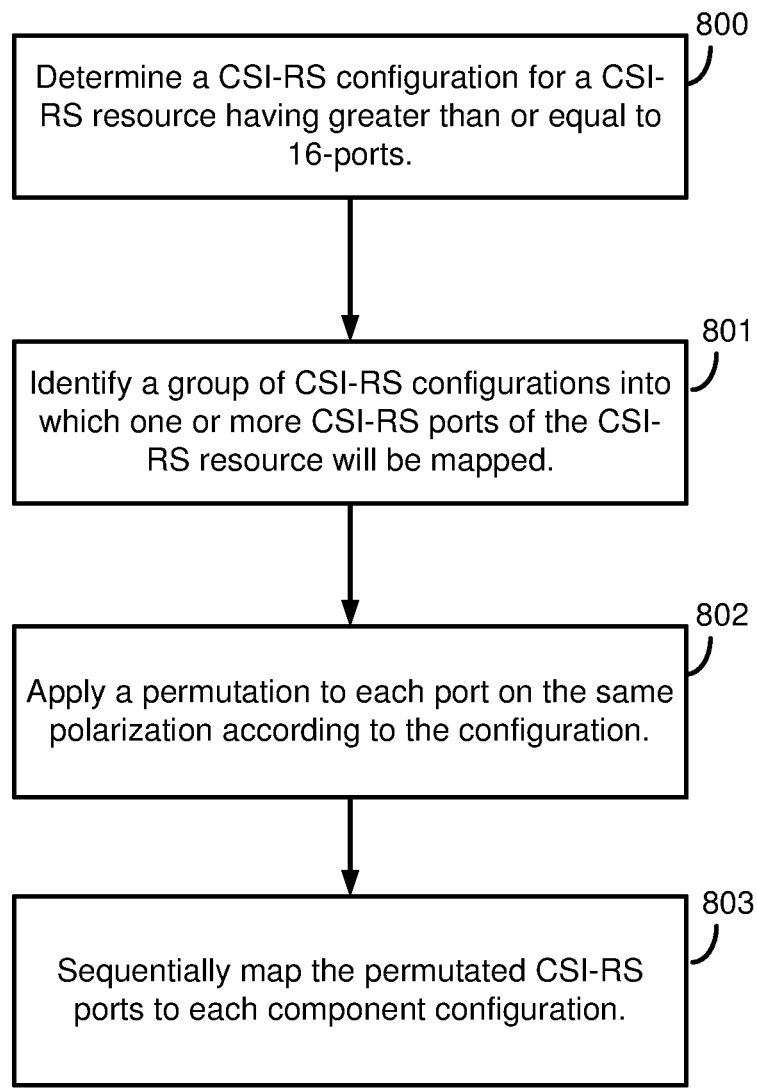
FIG. 8 is a block diagram illustrating example blocks executed to implement one aspect of the present disclosure.
Figure 12:
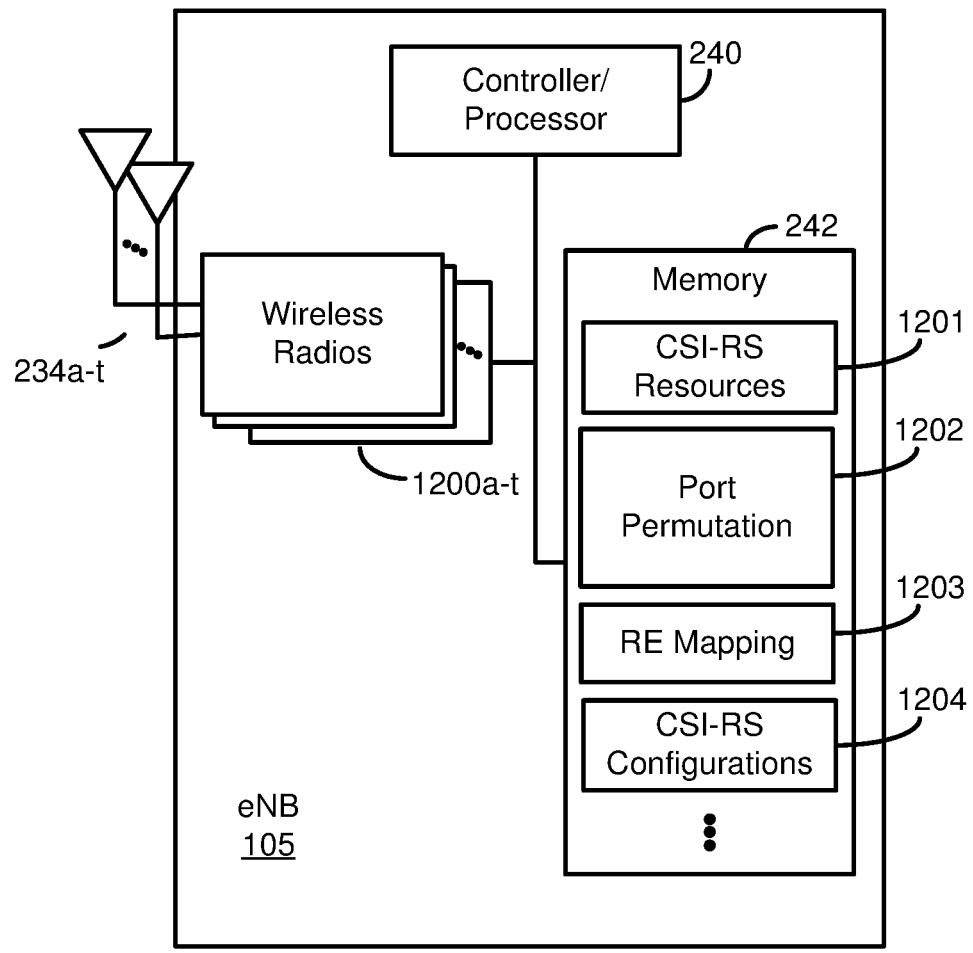
FIG. 12 is a block diagram illustrating an eNB configured according to one aspect of the present disclosure.

FIG. 8 is a block diagram illustrating example blocks executed to implement one aspect of the present disclosure. The example blocks will also be described with respect to eNB 105 as illustrated in FIG. 12. FIG. 12 is a block diagram illustrating eNB 105 configured according to one aspect of the present disclosure. eNB 105 includes the structure, hardware, and components as illustrated for eNB 105 of FIG. 2. For example, eNB 105 includes controller/processor 240, which operates to execute logic or computer instructions stored in memory 242, as well as controlling the components of eNB 105 that provide the features and functionality of eNB 105. eNB 105, under control of controller/processor 240, transmits and receives signals via wireless radios 1200a-t and antennas 234a-t. Wireless radios 1200a-t includes various components and hardware, as illustrated in FIG. 2 for eNB 105, including modulator/demodulators 232a-t, MIMO detector 236, receive processor 238, transmit processor 220, and TX MIMO processor 230.

At block 800, a CSI-RS configuration is determined by the base station with a CSI-RS resource having greater than or equal to 16-ports. For example, eNB 105 includes CSI-RS resources 1201, stored in memory 242, which identifies the various resources associated with corresponding CM-RS configurations. eNB 105 identifies those CSI-RS resources that have greater than or equal to 16 ports for port permutation.

At block 801, the base station identifies a group of CSI-RS configurations into which one or more CSI-RS ports of the CSI-RS resource will be mapped. For example, eNB 105 also includes CSI-RS configurations 1204, stored in memory 242, which identifies the various CSI-RS configurations for mapping the CSI-RS ports into. Under control of controller/processor 240, the various configurations within CSI-RS configurations 1204 are identified for mapping.

At block 802, the base station applies a permutation to each port on the same polarization according to the configuration. eNB 105 executes port permutation logic 1202, under control of controller/processor 240. Port permutation logic 1202 includes soft mathematic operations in additional to mathematic operations that are implemented in hardware, such as adders to apply the port permutation formula for the modifying the port indexing. The execution environment of port permutation logic 1202 is applied for each polarization, such that, with reference to FIG. 7, a first operation of port permutation logic 1202 would be applied to the antenna ports 15-24, having a first polarization, and a second operation of port permutation logic 1202 would be applied to the antenna ports 25-34, having a second polarization.

At block 803, the base station then sequentially maps the permutated CSI-RS ports to each component configuration.

For example, under control of controller/processor 240, eNB 105 executes RE mapping functionality 1203 stored in memory 242, which maps the permutated port indexes to the new port layout.

It should be noted that, the port permutation at block 802, is applied for CM-RS port layouts ($N_1$, $N_2$) where $N_2$ does not equal 2 or 4, or as determined by higher layer signaling. Table 1 below provides when port permutation is and is not performed based on the number of CSI-RS resource ports.

TABLE 1

| # CSI-RS Ports | Port layout no port permutation | Port layout port permutation performed |
|---|---|---|
| 20 | (10,1), (5,2) | (2,5) |
| 24 | (12,1), (6,2), (3,4) | (2,6), (4,3) |
| 28 | (14,1), (7,2) | (2,7) |
| 37 | (16,1), (8,2), (4,4) | (2,8) |

As indicated in block 802, port permutation through the execution environment of port permutation 1202, under control of controller/processor 240, is separately applied for each polarization. Thus, in one aspect of the present disclosure, ports in the first polarization identified according to:

$p \in (15, \ldots, 15+N_1N_2-1)$

Have the port permutation equation applied as follows:

$f(p) = \lfloor (p-x)/N_1 \rfloor + \text{mod}(p-x, N_1)*N_2 + x$, where $x=15$.  (3)

Ports in the second polarization identified according to:

$p \in (15+N_1N_2, \ldots, 15+2N_1N_2-1)$

Have the port permutation equation applied as follows:

$f(p) = \lfloor (p-x)/N_1 \rfloor + \text{mod}(p-x, N_1)*N_2 + x$, where $x=15+N_1N_2$.  (4)

The permutated port indexing for the 20-port and 24-port CSI-RS resources are shown in Table 2 below (bold=$1^{st}$ polarization; roman=$2^{nd}$ polarization).

TABLE 2

| | Permutated CSI-RS Port Index |
|---|---|
| 20-ports with (2,5) | {15, 20, 16, 21, 17, 22, 18, 23, 19, 24, 25, 30, 26, 31, 27, 32, 28, 33, 29, 34} |
| 24-ports with (2,6) | {15, 21, 16, 22, 17, 23, 18, 24, 19, 25, 20, 26, 27, 33, 28, 34, 29, 35, 30, 36, 31, 37, 32, 38} |
| 24-ports with (4,3) | {15, 18, 21, 24, 16, 19, 22, 25, 17, 20, 23, 26, 27, 30, 33, 36, 28, 31, 34, 37, 29, 32, 35, 38} |

Figure 9:
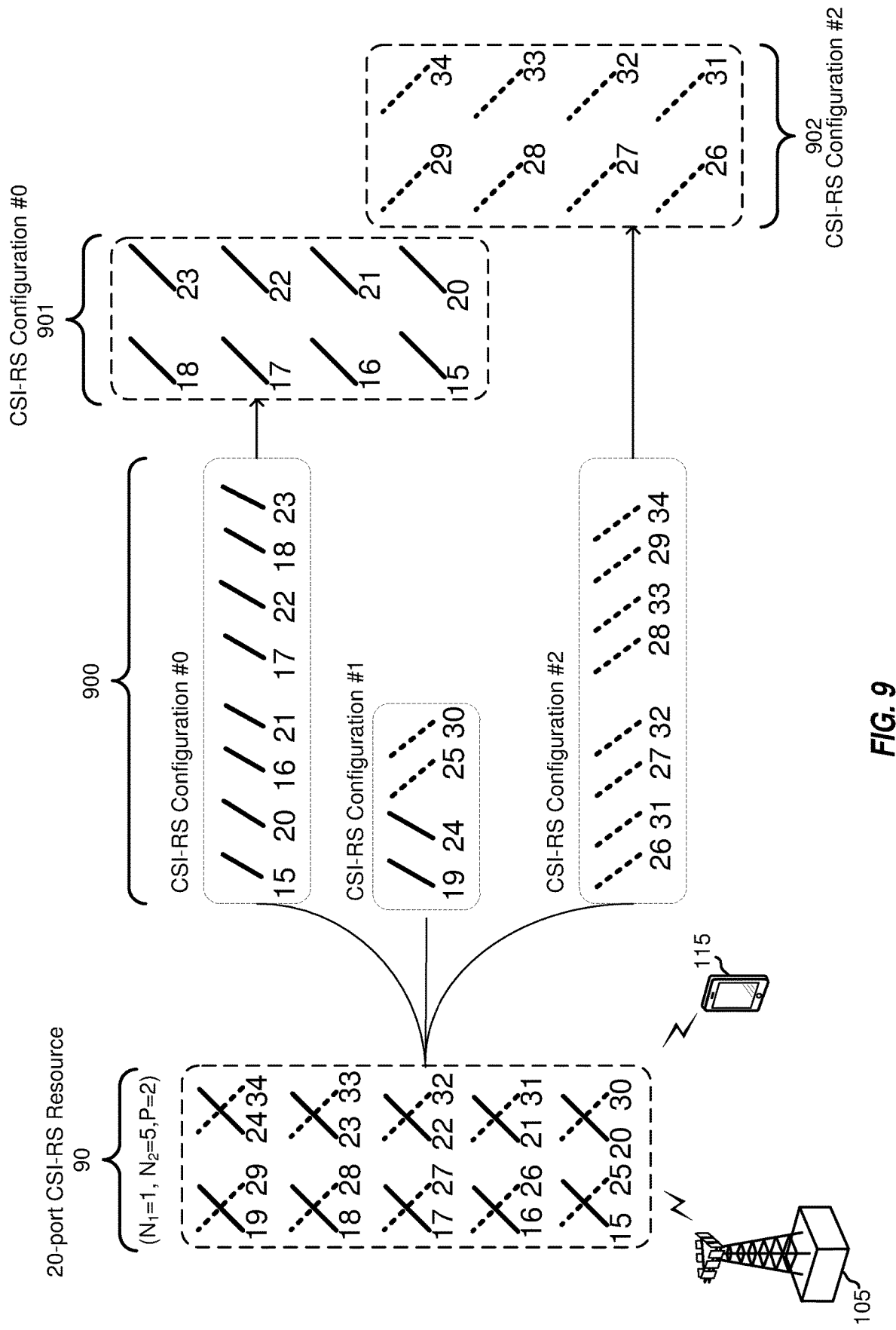
FIG. 9 is a block diagram illustrating a base station configured according to one aspect of the present disclosure performing mapping of a 20-port CSI-RS resource, with a CDM length of four for CSI-RS transmissions to a UE.

FIG. 9 is a block diagram illustrating a eNB 105 configured according to one aspect of the present disclosure performing mapping of a 20-port CSI-RS resource 70, with a CDM length of four for CSI-RS transmissions to UE 115. eNB 105 determines that the number of ports for CSI-RS resource 70 is greater than 16 and that configuration of the port layout provides an $N_2=5$, which is not equal to either 2 or 4, as noted above. As such, eNB 105 performs the port permutations according execution of port permutation logic 1202 to aspects of the present disclosure on each of the polarizations of the antenna ports. The original ports, indexed as illustrated in CSI-RS mappings 700, when applied to the execution environment of port permutation logic 1202, changes the port indexing through the permutations, as indicated in the first row (20-ports with (2,5)) of Table 2. The permutated CSI-RS ports are assigned to each component CSI-RS configuration, CSI-RS configurations #0-#2, of CSI-RS mappings 900, by using the sequential mapping approach.

For example, the permutated. CSI-RS ports with an index from $$\sum_{i=0}^{k-1} N_{ports,i}^{CSI} \text{ to } \sum_{i=0}^{k-1} N_{ports,i}^{CSI} + N_{ports,k}^{CSI} - 1$$

are assigned by eNB 105 to the $k^{th}$ component CSI-RS configuration. It may be seen that the CSI-RS ports mapped to CSI-RS configuration #0 901 and CSI-RS configuration #2 902, after the port permutation function, have a uniform 2D port structure and, thus, can now be reused by a 16-port CSI-RS resource.

Alternatively, port indexing for CSI-RS resources with ore than 16-ports can be written as:

$$p = f\left(p' + \sum_{i=0}^{k-1} N_{ports,i}^{CSI}\right) \quad (5)$$

where $p' \in (15, \ldots, 15+N_{ports,k}^{CSI}-1)$ is port indexing within $k^{th}$ component CSI-RS configuration, and f is a permutation function, e.g. f(p)=p, if either port mutation is not configured or $f(p) = \lfloor (p-x)/N_1 \rfloor + \text{mod}(p-x, N_1)*N_2 + x$, and $$x = \begin{cases} 15, & \text{for } p < 15 + N_1N_2 \\ 15 + N_1N_2, & \text{for } p \geq 15 + N_1N_2 \end{cases}.$$

Additional aspects of the present disclosure provide for CSI-RS resources having more than 16-ports and a CDM of length eight to achieve full. CSI-RS power utilization with 6 dB power boosting and to improve CSI-RS coverage. One issue with CDM of length eight is the construction of the RE sets, since the simple way of using eight REs within an 8-port CSI-RS configuration cannot achieve the desired maximum 6 dB power boosting, such as with the CSI-RS on symbol 5/6, thus, not achieving full power utilization.

Figure 10:
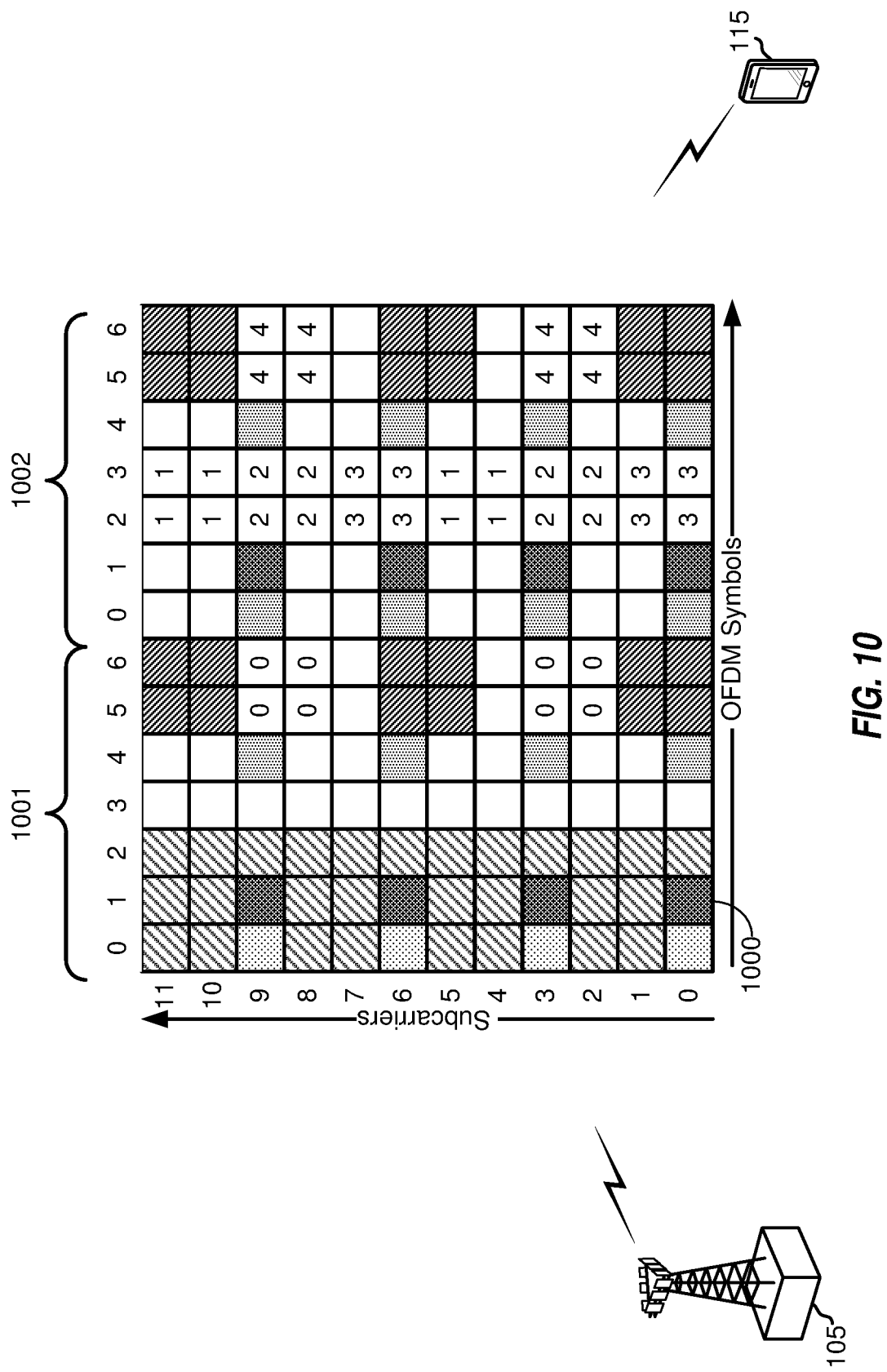
FIG. 10 is a block diagram illustrating an eNB mapping CSI-RS resources with a CDM length of eight for CSI-RS transmissions to a UE.

FIG. 10 is a block diagram illustrating an eNB 105 mapping CSI-RS resources with a CDM length of eight for CSI-RS transmissions to UE 115. When transmitting CSI-RS to UE 115, the CSI-RS resources with a CDM length of eight are mapped to resource block (RB) 1000 in a predetermined pattern of 8 REs. RB 1000 includes 12 carriers across 14 OFDM symbols divided into a first slot 1001 of seven OFDM symbols and a second slot 1002 of seven OFDM symbols. The CSI-RS resource configuration or pattern of REs for the CDM length eight illustrated in RB 1000 provides for the CSI-RS RE sets across six symbols. However, this particular pattern for CDM length eight may not be supported for TDD DwPTS of the special subframe, as only 4 symbols would be available for CSI-RS. Thus, if CDM length eight is supported, it may be preferred that the network flexibly configure the sets of REs based on the available CSI-RS resource.

A CSI-RS resource with CDM length of eight is generally composed as an aggregation of K=4 CSI-RS configurations with the same $N_{ports}^{CSI}=8$. The four CSI-RS configurations can be any four selected from a total of five possible configurations, labeled with numbers 0, 1, 2, 3, and 4 in FIG. 10. A CDM length of two is assumed for each of the CSI-RS configurations. One CSI-RS port will be mapped to all of the four configurations, e.g., CSI-RS port p∈(15, . . . , 15+2N$_1$, N$_2$−1) is mapped to p'=mod(p−15, N$_{ports}^{CSI}$)+1.5 of CSI-RS configurations #0, #1, #2 and #3. Ports {15, 23, 31, 39} are mapped to p'=15 of CSI-RS configurations #0, 1, 2, and 3, and ports {16, 24, 32, 40} are mapped to p'=16 of CSI-RS configurations #0, 1, 2, and 3, etc. Since a CDM length of two is assumed for port p' in each CSI-RS configurations, e.g., port p'=15 and p'=16 are mapped to the same set of two REs by a length-2 orthogonal cover code [1 1] or [1 −1]. Therefore, ports {15, 23, 31, 39} and ports {16, 24, 32, 40} are in the same CDM-8 groups. Similarly, ports {17, 25, 33, 41} and ports {18, 26, 34, 42} are in a second CDM-8 group, ports {19, 27, 35, 43} and ports {20, 28, 36, 44} are in a third CDM-8 group, and ports {21, 29, 37, 45} and ports {22, 30, 38, 46} are in a fourth CDM-8 group. The set of REs for CDM length eight may be constructed by eight REs occupied by port {x, x+1} of four configurations where x=15, 17, 19 and 21. The spreading sequence for CSI-RS port p is represented by $w_p = w_{p'} \otimes w_g$, where $w_{p'}$=[1 1] or [1 −1] determined by port index p' and $w_g$ is sequence for spreading across four configurations $w_g$=[a b c d] with g=⌊(p−15)/N$_{ports}^{CSI}$⌋∈{0, 1, 2, 3} where a is used for first CSI-RS configuration, h is used for the second CSI-RS configuration, c is used for third. CSI-RS configuration and d is used for the forth CSI-RS configuration. One example for $w_g$ spread sequence is to use a length-4 Walsh code, that is $w_0$=[1 1 1 1], $w_1$=[1 −1 1 −1], $w_2$=[1 1 −1 −1] and $w_3$=[1 −1 −1 1].

Figures 11A, 11B:
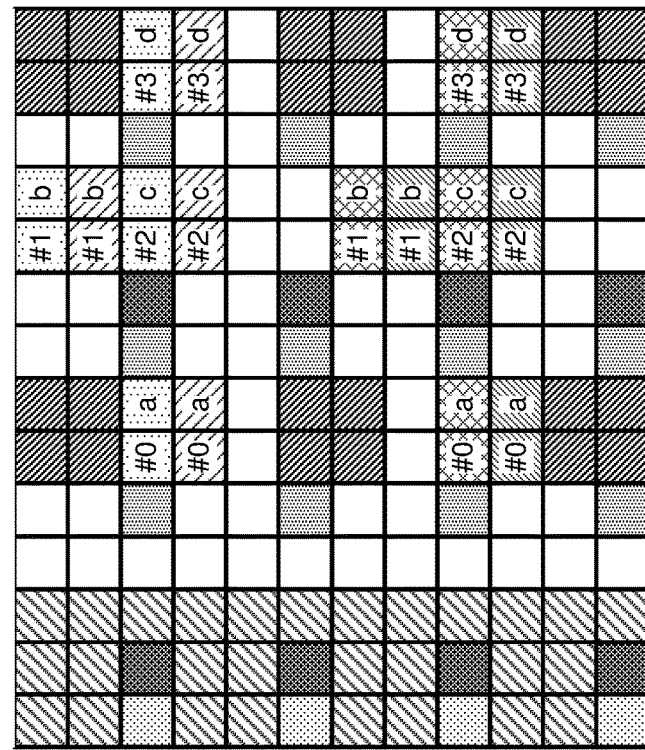

FIGS. 11A-11C are block diagrams illustrating eNB 105, configured according to aspects of the present disclosure with a CSI-RS resource mapping of CDM length eight for CSI-RS transmissions to UE 115. RBs 1100, 1101, and 1102 of FIGS. 11A-11C, respectively, are example possible RE sets for CDM length eight based on different combinations of 8-port CSI-RS configurations. The RBs 1100-1102 provides RE mappings for CSI-RS configurations #0, #1, #2, and #3 for CDM length eight. It should be noted that the different shadings for the CSI-RS configurations indicate a different set of REs available for CDM length eight. Based on the illustrated RBs 1100-1102, it may be observed that the RE sets for CDM length eight may be provided either across 4 symbols or 6 symbols, based on the particular CSI-RS configuration used and, thus, CDM length eight may be supported in both downlink and DwPTS subframes.

The mapping of CSI-RS port p to spreading sequence $w_g$ and $w_{p'}$ in CMD length eight are provided in Tables 3 and 4 below. A combined length-8 spreading sequence for each CSI-RS port p is provided in Table 5 below. It is noted that the mapping of spread sequence $w_p$ can be configuration order specific, e.g., $a_1$ and $a_2$ are used for first CSI-RS configuration, $b_1$ and $b_2$ are used for the second CSI-RS configuration, $c_1$ and $c_2$ are used for third CSI-RS configuration and $d_1$ and $d_2$ are used for the forth CSI-RS configuration. Alternatively, the mapping of the spread sequence can be non-configuration order specific, e.g., for the same four CSI-RS configurations the sequence mapping is not determined by the order of the configuration in the group of four CSI-RS configurations.

TABLE 3

| Port index p (N$_{ports}^{CSI}$ = 8) | $w_{p'}$ |
|---|---|
| 15, 17, . . . , 45 | [1 1] |
| 16, 18, . . . , 46 | [1 −1] |

TABLE 4

| Port index p ( N$_{ports}^{CSI}$ = 8) | $w_g$ = [a b c d] |
|---|---|
| 15, 16, . . . , 22 | [1 1 1 1] |
| 23, 24, . . . , 30 | [1 −1 1 −1] |
| 31, 32, . . . , 38 | [1 1 −1 −1] |
| 39, 40, . . . , 46 | [1 −1 −1 1] |

TABLE 5

| Port index p (N$_{ports}^{CSI}$ = 8) | $w_g$ = [a$_1$ a$_2$ b$_1$ b$_2$ c$_1$ c$_2$ d$_1$ d$_2$] |
|---|---|
| 15, 17, 19, 21 | [1 1 1 1 1 1 1 1] |
| 16, 18, 20, 22 | [1 −1 1 −1 1 −1 1 −1] |
| 23, 25, 27, 29 | [1 1 −1 −1 1 1 −1 −1] |
| 24, 26, 28, 30 | [1 −1 −1 1 1 −1 −1 1] |
| 31, 33, 35, 37 | [1 1 1 1 −1 −1 −1 −1] |
| 32, 34, 36, 38 | [1 −1 1 −1 −1 1 −1 1] |
| 39, 41, 43, 45 | [1 1 −1 −1 −1 −1 1 1] |
| 40, 42, 44, 46 | [1 −1 −1 1 −1 1 1 −1] |

Figure 13:
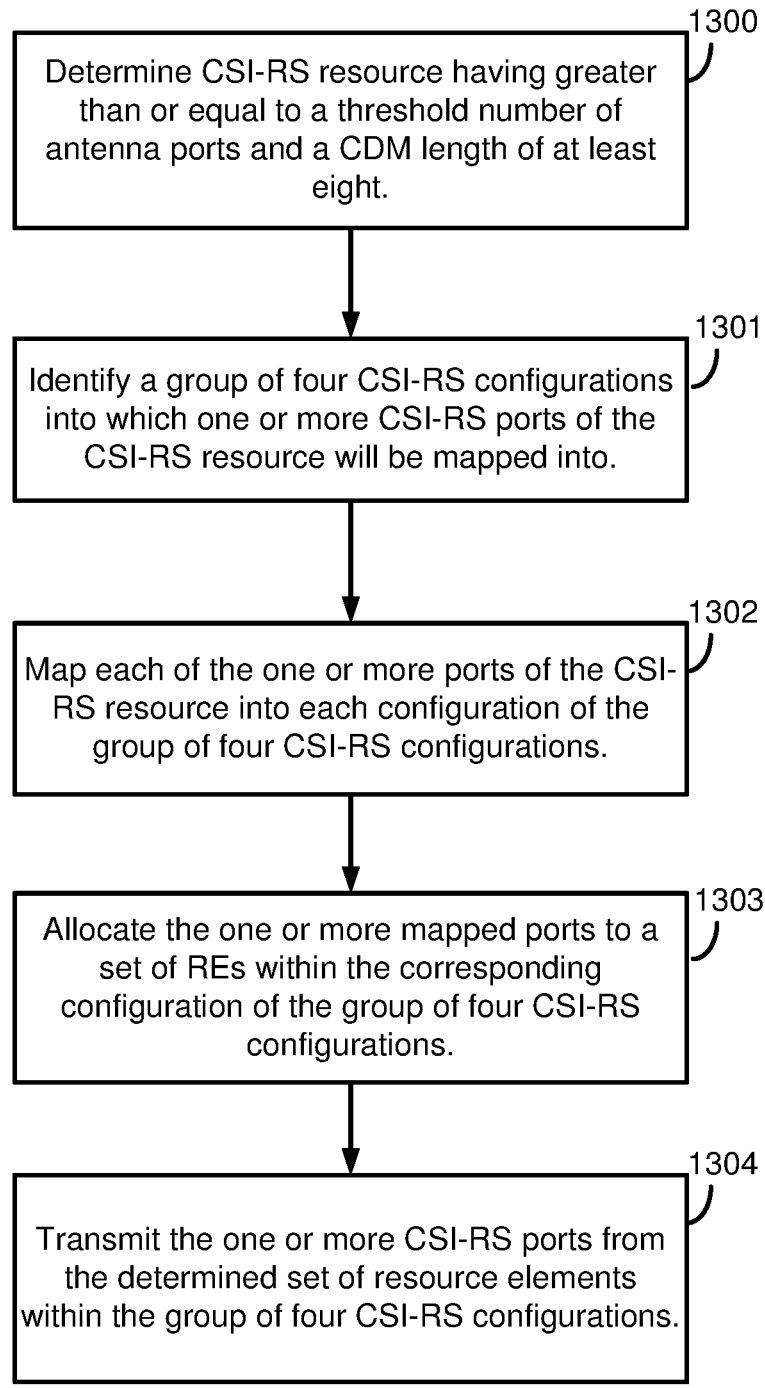
FIG. 13 is a block diagram illustrating example blocks executed to implement one aspect of the present disclosure.

FIG. 13 is a block diagram illustrating example blocks executed to implement one aspect of the present disclosure. The example blocks will also be described with respect to eNB 105 as illustrated in FIG. 12. At block 1300, a base station determines a CSI-RS resource having greater than or equal to a threshold number of antenna ports and a CDM length of at least eight. For example, eNB 105, under control of controller/processor 240, accesses CSI-RS resources 1201 in memory 240 to identify the number of antennas ports associated with a particular CSI-RS resource. Controller/processor 240 compares the number of antenna ports against a threshold number and identifies the CDM length.

At block 1301, the base station identifies a group of four CSI-RS configurations into which one or more CSI-RS ports of the CSI-RS resource will be mapped into. For example, eNB 105, under control of controller/processor 240 accesses CSI-RS configurations 1204 to identify the configurations into which the CSI-RS ports will be mapped into.

At block 1302, the base station maps each of the one or more ports of the CSI-RS resource into each configuration of the group of four CSI-RS configurations. For example, eNB 105, within the execution environment of CSI-RS configurations 1204, controller/processor 240 maps the ports of the identified CSI-RS resource into four of the available CSI-RS configurations.

At block 1303, the base station the one or more mapped ports to a set of REs within the corresponding configuration of the group of four CSI-RS configurations. For example, eNB 105, under control of controller/processor 240, executes RE mapping logic 1203, stored in memory 242, which operates to map the identified antenna ports into a specific pattern of REs.

At block 1304, the base station transmits the one or more CSI-RS ports from the determined set of resource elements within the group of four CSI-RS configurations. For example, controller/processor 240 of eNB 105 transmits the one or more CSI-RS ports from the determined set of REs with the group of four CSI-RS configurations. the transmissions occur via wireless radios 1200a-t and antennas 234a-t.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The present disclosure comprises a first aspect, such as a non-transitory computer-readable medium non-transitory computer-readable medium having program code recorded thereon, the program code comprising:

program code executable by a computer for causing the computer to determine, by a base station, a channel state information (CSI) reference signal (CSI-RS) resource having greater than or equal to a threshold number of antenna ports and a code divisional multiplex (CDM) length of at least four;

program code executable by the computer for causing the computer to identify a group of CSI-RS configurations into which one or more CSI-RS ports of the CSI-RS resource will be mapped;

program code executable by the computer for causing the computer to apply a port permutation to each port of the CSI-RS resource; and program code executable by the computer for causing the computer to sequentially map the permutated ports to each component configuration.

Based on the first aspect, the non-transitory computer-readable medium of a second aspect, wherein the CSI-RS resource is configured according to a port layout defined by $(N_1, N_2)$, and wherein the program code executable by the computer for causing the computer to apply the port permutation is triggered when $N_2$ is one of: not equal to 2, not equal to 4, or determined by higher layer signaling.

Based on the second aspect, the non-transitory computer-readable medium of a third aspect, wherein the program code executable by the computer for causing the computer apply a port permutation includes:

program code executable by the computer for causing the computer to apply a first permutation to each first port of the CSI-RS resource having a first polarization; and program code executable by the computer for causing the computer to apply a second permutation to each second port of the CSI-RS resource having a second polarization.

A fourth aspect of the non-transitory computer-readable medium of any combination of the first through third aspects.

The present disclosure comprises a fifth aspect, such as a non-transitory computer-readable medium non-transitory computer-readable medium having program code recorded thereon, the program code comprising:

program code executable by a computer for causing the computer to determine, by a base station, a channel state information (CSI) reference signal (CSI-RS) resource having greater than a threshold number of antenna ports and a code divisional multiplex (CDM) length of at least eight;

program code executable by the computer for causing the computer to identify a group of four CSI-RS configurations into which one or more CSI-RS ports of the CSI-RS resource will be mapped into;

program code executable by the computer for causing the computer to map each of the one or more ports of the CSI-RS resource into each configuration of the group of four CSI-RS configurations;

program code executable by the computer for causing the computer to allocate the one or more mapped ports to a set of resource elements (REs) within the corresponding configuration of the group of four CSI-RS configurations; and program code executable by the computer for causing the computer to select one CSI-RS configuration of the group of four CSI-RS configurations for CSI-RS transmission based on available CSI-RS resources and subframe type.

Based on the fifth aspect, the non-transitory computer-readable medium of a sixth aspect, wherein the one or more mapped ports are allocated to the set of REs within the corresponding configuration based on a spreading sequence for spreading across the group of four CSI-RS configurations.

Based on the sixth aspect, the non-transitory computer-readable medium of a seventh aspect, wherein the group of four CSI-RS configurations include the set of REs positioned across one of: four symbols or six symbols, based on the corresponding CSI-RS configuration.

An eighth aspect e non-transitory computer-readable medium of any combination of the fifth through seventh aspects.

In one or more exemplary designs, the functions described may be implemented through computer-executable instructions in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    determining, by a base station, a channel state information (CSI) reference signal (CSI-RS) resource having greater than or equal to a threshold number of antenna ports and a code divisional multiplex (CDM) length of at least eight;
    identifying a group of four CSI-RS configurations into which one or more CSI-RS ports of the CSI-RS resource will be mapped into;
    mapping each of the one or more ports of the CSI-RS resource into each configuration of the group of four CSI-RS configurations;
    allocating the one or more mapped ports to a set of resource elements (REs) within the corresponding configuration of the group of four CSI-RS configurations, wherein the one or more mapped ports are allocated to the set of REs within the corresponding configuration based on a spreading sequence for spreading across the group of four CSI-RS configurations; and
    transmitting the one or more CSI-RS ports from the determined set of resource elements within the group of four CSI-RS configurations.

2. The method of claim 1, wherein the mapping of spreading sequence to the set of resource elements is determined by the order of the four CSI-RS configurations in the group of four CSI-RS configurations.

3. The method of claim 1, wherein the group of four CSI-RS configurations include the set of REs positioned across one of: four symbols or six symbols, based on the corresponding CSI-RS configuration and subframe type.

4. The method of claim 1, wherein the threshold number of antenna ports is 32; wherein each CSI-RS configuration in the group of four CSI-RS configurations indicates an 8-port CSI-RS configurations.

5. An apparatus configured for wireless communication, comprising:
    means for determining, by a base station, a channel state information (CSI) reference signal (CSI-RS) resource having greater than or equal to a threshold number of antenna ports and a code divisional multiplex (CDM) length of at least eight;
    means for identifying a group of four CSI-RS configurations into which one or more CSI-RS ports of the CSI-RS resource will be mapped into;
    means for mapping each of the one or more ports of the CSI-RS resource into each configuration of the group of four CSI-RS configurations;
    means for allocating the one or more mapped ports to a set of resource elements (REs) within the corresponding configuration of the group of four CSI-RS configurations, wherein the one or more mapped ports are allocated to the set of REs within the corresponding configuration based on a spreading sequence for spreading across the group of four CSI-RS configurations; and
    means for transmitting the one or more CSI-RS ports from the determined set of resource elements within the group of four CSI-RS configurations.

6. The apparatus of claim 5, wherein the means for mapping of spreading sequence to the set of resource elements is determined by the order of the four CSI-RS configurations in the group of four CSI-RS configurations.

7. The apparatus of claim 5, wherein the group of four CSI-RS configurations include the set of REs positioned across one of: four symbols or six symbols, based on the corresponding CSI-RS configuration and subframe type.

8. The apparatus of claim 5, wherein the threshold number of antenna ports is 32; wherein each CSI-RS configuration in the group of four CSI-RS configurations indicates an 8-port CSI-RS configurations.

9. A non-transitory computer-readable medium having program code recorded thereon, the program code, which is executed by the computer, causing the computer to:
- determine, by a base station, a channel state information (CSI) reference signal (CSI-RS) resource having greater than or equal to a threshold number of antenna ports and a code divisional multiplex (CDM) length of at least eight;
- identify a group of four CSI-RS configurations into which one or more CSI-RS ports of the CSI-RS resource will be mapped into;
- map each of the one or more ports of the CSI-RS resource into each configuration of the group of four CSI-RS configurations;
- allocate the one or more mapped ports to a set of resource elements (REs) within the corresponding configuration of the group of four CSI-RS configurations, wherein the one or more mapped ports are allocated to the set of REs within the corresponding configuration based on a spreading sequence for spreading across the group of four CSI-RS configurations; and
- transmit the one or more CSI-RS ports from the determined set of resource elements within the group of four CSI-RS configurations.

10. The non-transitory computer-readable medium of claim 9, wherein the program code includes program code causing the computer to map of spreading sequence to the set of resource elements is determined by the order of the four CSI-RS configurations in the group of four CSI-RS configurations.

11. The non-transitory computer-readable medium of claim 9, wherein the group of four CSI-RS configurations include the set of REs positioned across one of: four symbols or six symbols, based on the corresponding CSI-RS configuration and subframe type.

12. The non-transitory computer-readable medium of claim 9, wherein the threshold number of antenna ports is 32; wherein each CSI-RS configuration in the group of four CSI-RS configurations indicates an 8-port CSI-RS configurations.

13. An apparatus configured for wireless communication, the apparatus comprising:
- at least one processor; and
- a memory coupled to the at least one processor,
- wherein the at least one processor is configured:
  - to determine, by a base station, a channel state information (CSI) reference signal (CSI-RS) resource having greater than or equal to a threshold number of antenna ports and a code divisional multiplex (CDM) length of at least eight;
  - to identify a group of four CSI-RS configurations into which one or more CSI-RS ports of the CSI-RS resource will be mapped into;
  - to map each of the one or more ports of the CSI-RS resource into each configuration of the group of four CSI-RS configurations;
  - to allocate the one or more mapped ports to a set of resource elements (REs) within the corresponding configuration of the group of four CSI-RS configurations, wherein the one or more mapped ports are allocated to the set of REs within the corresponding configuration based on a spreading sequence for spreading across the group of four CSI-RS configurations; and
  - to transmit the one or more CSI-RS ports from the determined set of resource elements within the group of four CSI-RS configurations.

14. The apparatus of claim 13, wherein the configuration of the at least one processor to map of spreading sequence to the set of resource elements is determined by the order of the four CSI-RS configurations in the group of four CSI-RS configurations.

15. The apparatus of claim 13, wherein the group of four CSI-RS configurations include the set of REs positioned across one of: four symbols or six symbols, based on the corresponding CSI-RS configuration and subframe type.

16. The apparatus of claim 13, wherein the threshold number of antenna ports is 32; wherein each CSI-RS configuration in the group of four CSI-RS configurations indicates an 8-port CSI-RS configurations.

\* \* \* \* \*